(12) United States Patent
Nariyambut Murali et al.

(10) Patent No.: US 10,124,730 B2
(45) Date of Patent: Nov. 13, 2018

(54) VEHICLE LANE BOUNDARY POSITION

(71) Applicant: Ford Global Technologies, LLC, Dearborn, MI (US)

(72) Inventors: Vidya Nariyambut Murali, Sunnyvale, CA (US); Tejaswi Koduri, Palo Alto, CA (US); Smita Vinayak Bailur, Palo Alto, CA (US); Kyle J Carey, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 421 days.

(21) Appl. No.: 15/073,180

(22) Filed: Mar. 17, 2016

(65) Prior Publication Data

US 2017/0267177 A1    Sep. 21, 2017

(51) Int. Cl.

| | |
|---|---|
| *B60R 1/00* | (2006.01) |
| *G06K 9/00* | (2006.01) |
| *G06K 9/66* | (2006.01) |
| *G08G 1/16* | (2006.01) |
| *G06K 9/46* | (2006.01) |
| *G06K 9/62* | (2006.01) |
| *G06N 3/04* | (2006.01) |

(52) U.S. Cl.
CPC ............ *B60R 1/00* (2013.01); *G06K 9/00798* (2013.01); *G06K 9/4628* (2013.01); *G06K 9/6271* (2013.01); *G06K 9/66* (2013.01); *G08G 1/167* (2013.01); *B60R 2300/205* (2013.01); *B60R 2300/30* (2013.01); *B60R 2300/804* (2013.01); *G06N 3/0445* (2013.01)

(58) Field of Classification Search
None
See application file for complete search history.

(56) References Cited

U.S. PATENT DOCUMENTS

| | | | |
|---|---|---|---|
| 2009/0043506 A1* | 2/2009 | Breed | G08G 1/161 701/472 |
| 2011/0187863 A1 | 8/2011 | Glander | |

FOREIGN PATENT DOCUMENTS

| | | |
|---|---|---|
| CN | 102819263 B | 11/2014 |
| CN | 104700657 A | 6/2015 |
| JP | 3941252 B2 | 7/2007 |
| KR | 20140094794 A | 7/2014 |
| KR | 101565006 B1 | 11/2015 |

OTHER PUBLICATIONS

"SegNet: A Deep Convolutional Encoder-Decoder Architecture for Robust Semantic Pixel-Wise Labelling", Badrinarayanan et al., arXiv:1505.07293v1, May 27, 2015 (Year: 2015).*

(Continued)

*Primary Examiner* — Janese Duley
(74) *Attorney, Agent, or Firm* — David R. Stevens; Stevens Law Group

(57) ABSTRACT

A method for determining a position of a vehicle in a lane includes receiving perception information from a first camera positioned on a first side of a vehicle and a second camera positioned on a second side of the vehicle. The method includes determining, using one or more neural networks, a position of the vehicle with respect to lane markings on the first side and the second side of the vehicle. The method further includes notifying a driver or control system of the position of the vehicle.

15 Claims, 5 Drawing Sheets

(56) References Cited

OTHER PUBLICATIONS

"SegNet: A Deep Convolutional Encoder-Decoder Architecture for Image Segmentation", Kendall et al., arXiv:1511.00561v1 Nov. 2, 2015 (Year: 2015).*
Adjacent Lane Detection and Lateral Vehicle Distance Measurement Using Vision-Based Neuro-Fuzzy Approaches.
An Empirical Evaluation of Deep Learning on Highway Driving.

* cited by examiner

VEHICLE LANE BOUNDARY POSITION

TECHNICAL FIELD

The disclosure relates generally to methods, systems, and apparatuses for detecting lane boundary position of a vehicle and more particularly relates to estimating a relative position of a lane boundary with side cameras of a vehicle.

BACKGROUND

Automobiles provide a significant portion of transportation for commercial, government, and private entities. Due to the high value of automobiles and potential harm to passengers and drivers, driver safety and avoidance of collisions, accidents, or other damage to vehicles are extremely important. Autonomous vehicles and driving assistance systems are currently being developed and deployed to provide safety, reduce an amount of user input required, or even eliminate user involvement entirely. Visual perceptions for autonomous navigation pose many varied challenges, but with many benefits because images provide rich information about the driving environment of the vehicle.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
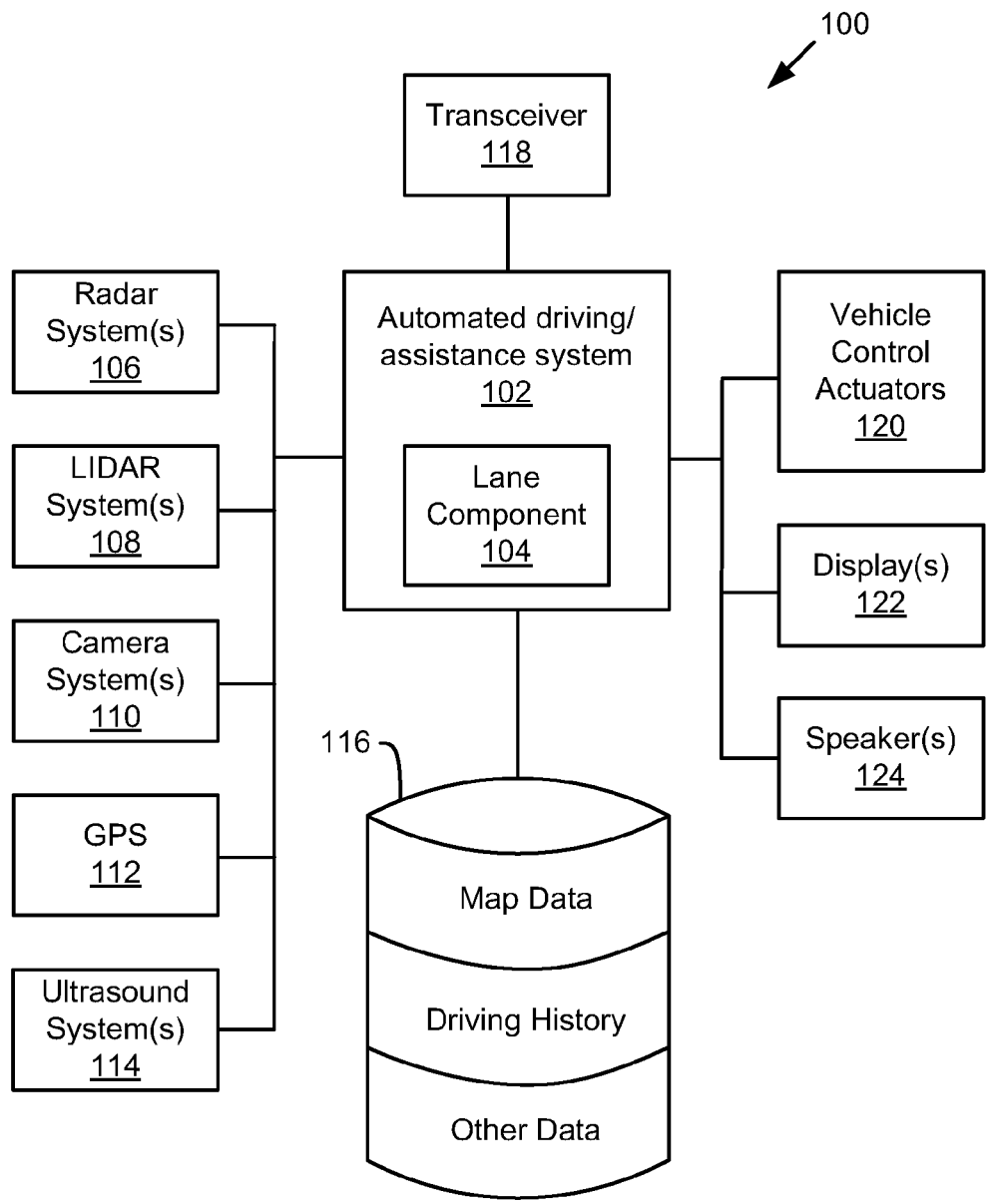
FIG. 1 is a schematic block diagram illustrating an implementation of a vehicle control system that includes an automated driving/assistance system.

Visual perceptions for autonomous or assisted navigation pose many varied challenges, but also present many benefits as images can provide rich information about a driving environment. In fact, computer vision based solutions may be used in many advanced driver assistance systems (ADAS) and automated vehicles (AV). For example, camera or video images may be used for assisting in lane centering, lane following, and other autonomous or semi-autonomous features that may be developed and available on the market. Due to the safety requirements with vehicles, it is important to validate the reliability and robustness of lane following features.

Traditionally cameras are placed facing forward near a rear view mirror. However, this might not always present the best possible view of the lanes and lane markings. Furthermore, annotating data using traditional computer-vision techniques for later validation is a much bigger task. Annotating the data to correctly identify lane markings or the like is often challenging based on variations in road conditions, shadows, spurious reflections, differences in illumination, perspective distortions based on angle of view, variations in height of the camera above the ground, and many other factors. Hand-crafted features, or thresholding of image pixels, are generally insufficient for continuous tracking of the lane boundaries with high accuracy. For example, lane boundaries may be of different types, depending on whether they are located on a high, internal road, or other road. Furthermore, lane boundaries may vary for even the same environment. For example, the lane boundaries may include double, single, broken, solid, yellow, and/or white painted lines. Additionally, lane boundaries may include reflectors or other markers that do not include a painted line. The variations in the appearance and/or type of lane markings can present a major challenge in developing or validating lane-based ADAS/AV features.

Applicants have developed systems, methods, and devices for detecting lane markings and/or determining a position of a vehicle with respect to lane markings. In one embodiment, cameras are positioned to provide a close-up view of the lane. Some embodiments provide robust methods for annotating lanes, including determining whether a lane (or lane marking) is present or not and a distance to any detected lane markings. According to one embodiment, a method for determining a relative position of a vehicle to a lane includes receiving perception information from a first camera positioned on a first side of a vehicle and a second camera positioned on a second side of the vehicle. The method also includes determining, using one or more neural networks, a position of the vehicle with respect to lane markings on the first side and the second side of the vehicle. The method also includes notifying a driver or control system of the position of the vehicle.

In one embodiment, cameras may be positioned laterally on either side of the vehicle to give a favorable view of the lane. In one embodiment, by positioning the cameras on the side of the vehicle, the cameras may be placed at a lower height to allow for a better view of nearby lane markings. For example, if the cameras are positioned on top of a vehicle or on a windshield of a vehicle, the cameras may be located farther away from lane markings and/or their view may be obscured by other portions of the vehicle. Additionally, vehicle heights vary considerably so different vehicles may require significantly different calibration or training. In one embodiment, the cameras may be positioned to face in a direction substantially perpendicular to a longitudinal axis of the vehicle. For example, the cameras may have a viewing angle lateral to a direction of travel of a vehicle (e.g., parallel to an axle of one or more wheels of the vehicle).

In one embodiment, the cameras are calibrated (modified to change a focal point, position, or optical property of the camera) to represent a distance from a vehicle to a lane boundary or marking as being the distance from the baseline of a capture image to the lane marking in the image. For example, a system may be able to determine a distance to the lane marking by determining the lowest row position to a bottom of an image that corresponds to a lane boundary or marking. In one embodiment, neural networks may be used to determine the row that corresponds to the closest lane marking. The neural networks may be trained using example images. For example, a neural network may be trained using 100 hours' worth of data collected at speeds from 30 kph to 120 kph. The training data may be human annotated to provide the distance of the lane from the vehicle. For example, the annotation may indicate the distance as a number of pixels in the image. In one embodiment, training data may be organized such that every image has a corresponding label representing a pixel row position of a lane marking in the image (e.g., between 0 and the height, in pixels, of the image).

In one embodiment, a neural network may be used to learn the lane marking positions within the image based on training data. The neural network may include a deep convolutional neural network. For example, the neural network may have 7, 8, or more layers. As another example, the neural network may have convolutional filter windows that correspond to thickness of lane markings (such as painted lane lines). In one embodiment, the neural network includes a Euclidian loss layer to signify a regression, which may be different than some classification networks. In one embodiment, the neural network may be configured to take in a color image of width M pixels and height N pixels and output a single integer in the range 0 to N. The output integer may correspond to the distance, in pixels, from the bottom of the image to the first pixel that corresponds to a lane marking. When scaled and/or offset properly, the output integer may represent a distance between the center of the parent vehicle and a lane marking. In one embodiment, determining the distance to lane markings may be performed using images from both sides of the vehicle. According to one embodiment, a system may filter outputs from the neural network (e.g., based on sequential images). The system may filter using a state-space estimation technique and track the changes to provide information useful for balancing a vehicle in a lane, and/or for various active safety applications.

Embodiments presented herein may provide one or more benefits over currently available technologies. For example, positioning of cameras on the side of the vehicle may provide a better view of a lane or lane markings. In one embodiment, lateral placement and orientation of the cameras provide a best possible view of the lane markings. For example, because of the camera placement, the lane markings may be sufficiently distinct and clear. A clear view of the lane boundaries or markings may simplify the problem, make it better defined, and improve accuracy and efficiency for locating lane boundaries or markings. For example, previous methods and technologies required the extraction of lane boundaries or lane markings to extract lane segments, which were localized in an image. However, these systems still require the algorithm to "search" for the lane in the image with an ill-defined problem. The solutions presented herein use a deep learning technique with hand annotated data, which may result in greater accuracy.

Another example benefit may include computational efficiency. For example, the camera placement on the side of the vehicle may case the lane markings to be sufficiently distinct that a low-resolution image may be used. The lower resolution may reduce the computing power needed. Furthermore, traditional computer vision based solutions generally must search for the lane or lane markings, which is time consuming and processor intensive. The deep learning based solutions provided herein may reduce the needed time and/or the computational resources to reduce costs and improve safety.

Referring now to the figures, FIG. 1 illustrates an example vehicle control system 100 that may be used to detect lanes, including lane markings or boundaries. The vehicle control system 100 may include an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may include a lane component 104 that uses a neural network, or other model or algorithm, to detect a lane marking or boundary and/or to determine a position of the vehicle in relation to the lane. In one embodiment, the automated driving/assistance system 102 may determine a driving maneuver or driving path to maintain or place the vehicle at or near a center of the lane.

The vehicle control system 100 may also include one or more sensor systems/devices for detecting a presence of nearby objects, lane markers, and/or or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultra sound systems 114. The vehicle control system 100 may include a data store 116 for storing relevant or useful data for navigation and safety such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. The automated driving/assistance system 102 may implement an algorithm or use a model, such as a deep neural network, to process the sensor data and identify a presence, location, and/or relative distance of a lane marking with respect to the vehicle.

In one embodiment, the camera systems 110 may include a plurality of cameras. For example, the camera systems 110 may include cameras facing in different directions to provide different views and different fields of view for areas near or around the vehicle. For example, some cameras may face forward, sideward, rearward, at angles, or in any other direction. In one embodiment, the camera systems 110 may include cameras positioned on lateral sides of the vehicle. For example, the camera systems 110 may include a camera positioned on a right side of the vehicle and a camera positioned on the left side of the vehicle. Cameras positioned on a side of a vehicle may face in any direction, such as forward, rearward, sideways, at a forward angle, or at a rearward angle. In one embodiment, the cameras are positioned lower than a top of the vehicle. In one embodiment, the cameras are positioned on a side panel of the vehicle. The side cameras may be positioned to limit a distance between the ground and the camera such that an improved field of view of any lane boundaries, markings or lines is possible.

The camera systems 110 may include cameras positioned on opposite sides of the vehicle so that lane markings on each side of the vehicle can be detected. In one embodiment, the side cameras may be angled downward to provide information about a region on the ground immediately next to the vehicle. For example, the camera may be oriented to face in a direction perpendicular, or substantially perpendicular, to an axis of the vehicle and with a downward angle to provide a view of the ground horizontally neighboring a wheel or side panel of the vehicle. Thus, if a lane marking is right next to the side of the vehicle, the marking may be shown within an image captured by a side camera.

Figure 2:
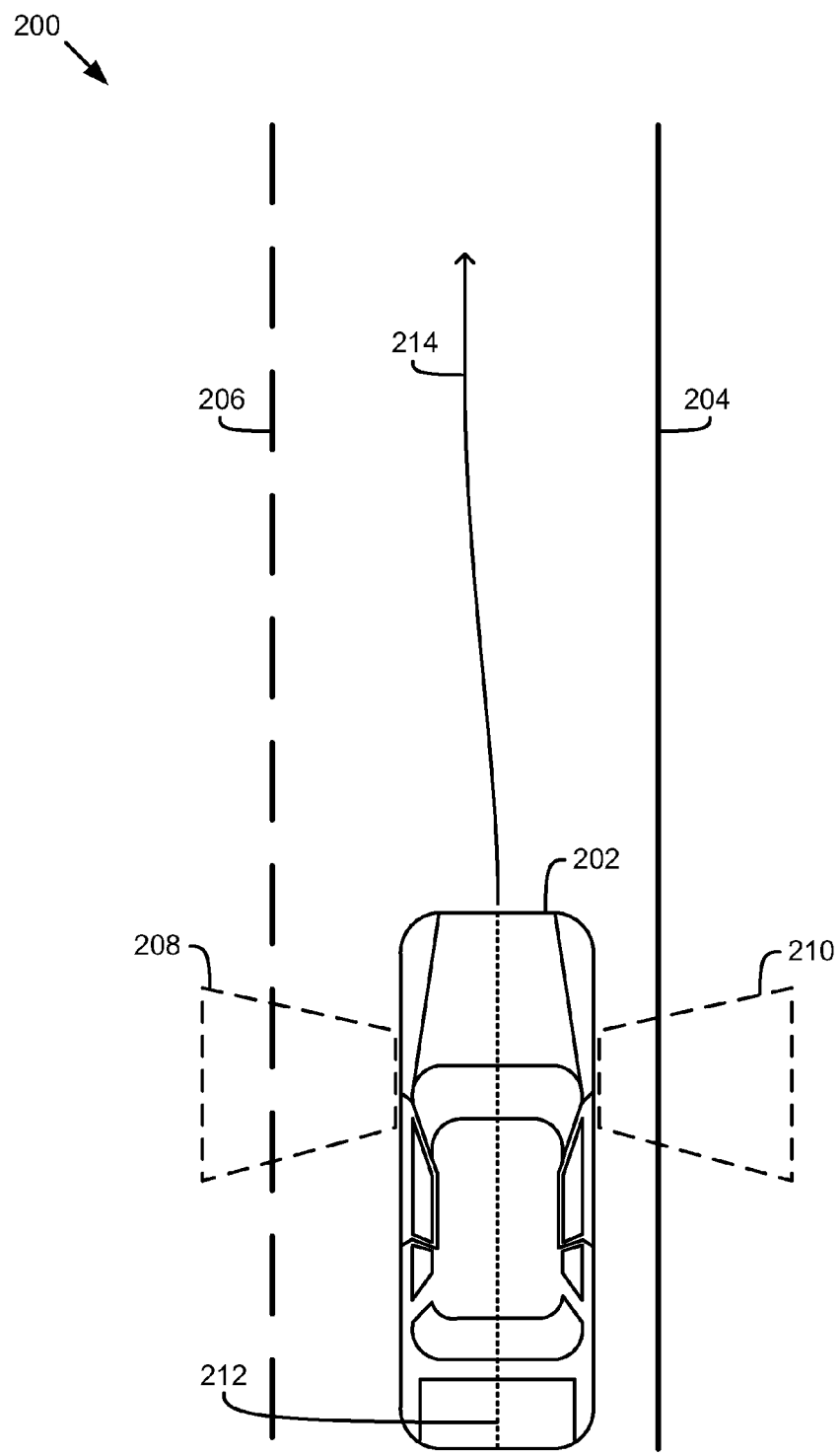
FIG. 2 illustrates regions observed by cameras of a vehicle on a roadway, according to one implementation.

FIG. 2 is a schematic plan view diagram illustrating a vehicle 202 driving on a roadway 200. The roadway 200 is marked with lane markings including a solid line 204 and a broken line 206. For example, the sold line 204 may indicate a boundary between the roadway 200 and a shoulder, while the broken line 206 may indicate a boundary between lanes on the roadway 200. The lane markings may be white, yellow, any other color, or may be some physical marker other than a colored marker according to local conventions for the roadway.

The vehicle 202 may include a plurality of laterally positioned cameras that are oriented to obtain images of ground regions near the vehicle 202. For example, a camera (not shown) positioned on a left side of the vehicle 202 may obtain images of the ground in the left side region 208 (indicated by dashed lines) and a camera (not shown) positioned on a right side of the vehicle 202 may obtain images of the ground in the right side region 210 (indicated by dashed lines). As the vehicle 202 moves along the roadway, the lane markings (solid line 204 and broken line 206) may be within view of the left and right side cameras. For example, a portion of the broken line 206 is within the left side region 208 and a portion of the solid line 204 is within the right side region. The side cameras may periodically obtain images of the ground regions 208 and 210 near the vehicle and the vehicle 202 (such as the lane component 104 of the vehicle 202) may use this information to determine a position of the vehicle 202 within a lane of the roadway 200. The positions or distances determined by the lane component 104 may include distances between lane markings 204 and 206 and a side panel of the vehicle 202 or distances between lane markings 204 and 206 and an axis 212 (e.g., the long axis) of the vehicle 202.

In one embodiment, the side cameras provide an up-close view of lane markings to increase accuracy and/or reduce processing power in localizing the vehicle 202 within a lane. For example, a front facing camera may not provide a close enough view of the lane lines and may require a more difficult processing problem to determine a location of the vehicle 202 with respect to lane markings. Additionally, road curvature or the like may further complicate the problem. Thus, extremely accurate lane positioning and driving may be possible, which can significantly increase driving safety, especially when a large number of vehicles are driving on a roadway and need to stay in their corresponding lanes. In fact, the accuracy provided by side cameras, associated algorithms, and neural networks discussed herein may allow for extremely high accuracy to allow for validation of other systems, building of accurate maps, building or recording of accurate drive history, or other tasks that require a high degree of lane precision.

Based on the accurate positioning, a driving path 214 may be calculated to place the vehicle 202 within the center of a lane or to maintain the vehicle 202 at or near a center of the lane. The driving path 214 may be computed to keep the vehicle within the lane and thus minimize risk of accidents with other vehicles in other lanes or risk of driving off of the roadway 200. Driving maneuvers may be determined based on the current position in the lane as well as any other available information, such as perception information from a forward and/or rear facing camera, LIDAR system 108, radar system 106, map data, driving history, or any other data. For example, a current position of the vehicle 202 within the lane as well as a curvature of the lane or roadway 200 may be used to determine a future driving path for the vehicle 202.

Figure 3:
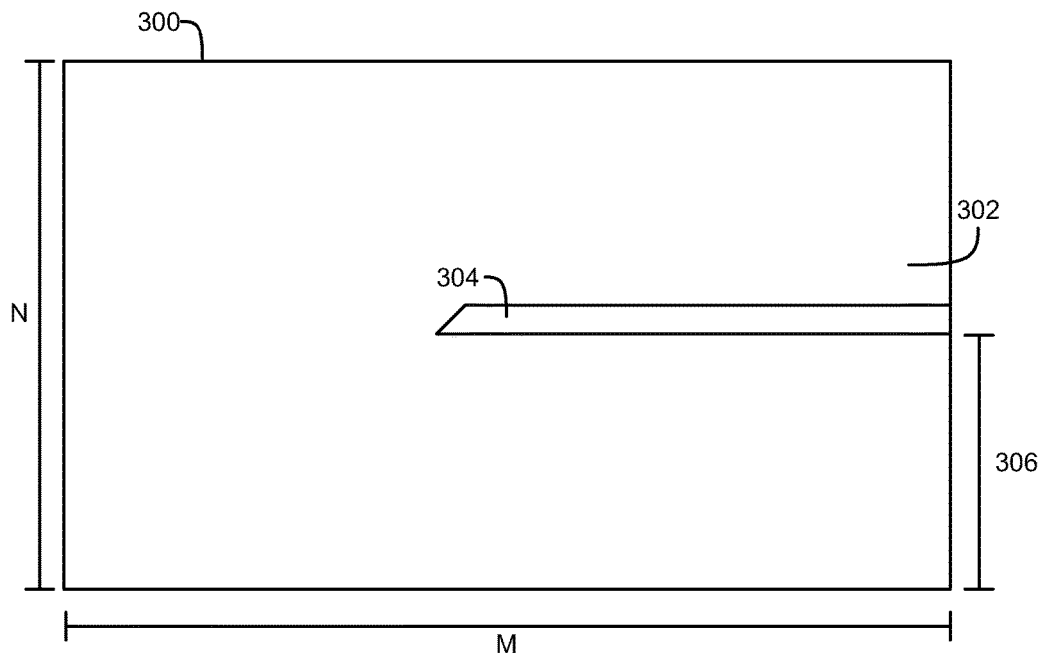
FIG. 3 illustrates an image of a lane marker, according to one implementation.

FIG. 3 depicts an example image 300 captured by a side view camera. The image 300 shows a surface 302 of a roadway with a lane marking 304. The image 300 has a pixel height of N and a pixel width of M. In one embodiment, the lane component 104 may receive the image 300 and determine a distance 306 from a bottom of the image 300 to the lane marking 304. The distance 306 may be determined as a pixel value (e.g., a pixel height) or may be determined based on a distance measurement unit such as feet or meters. In one embodiment, a distance 306 in pixels may be converted to distance using a preconfigured function or calculation. For example, a linear or parabolic function based on the location and orientation of the camera may be used to convert a pixel length or height into feet or meters. In one embodiment, the lane component 104 may use a neural network to determine the distance 306. In one embodiment, if a lane marking 304 is not present, the lane component 104 may return a null value to indicate that there is no lane marking in the image.

The image 300 presents a simplified problem in determining a distance from a vehicle to a lane marking. Due to the proximity to the lane markings that are being captured in a photograph, as well as the predictable determination (using a neural network or algorithm) of the distance of a lane marking from a bottom of the image 300, significantly lower cost hardware may be used and increased efficiency may be achieved. For example, the image 300 may be a low resolution image with respect to other images or perception data captured by a vehicle due to reduced complexity in detecting the barrier in the image 300, as compared to front facing camera images.

Figure 4:
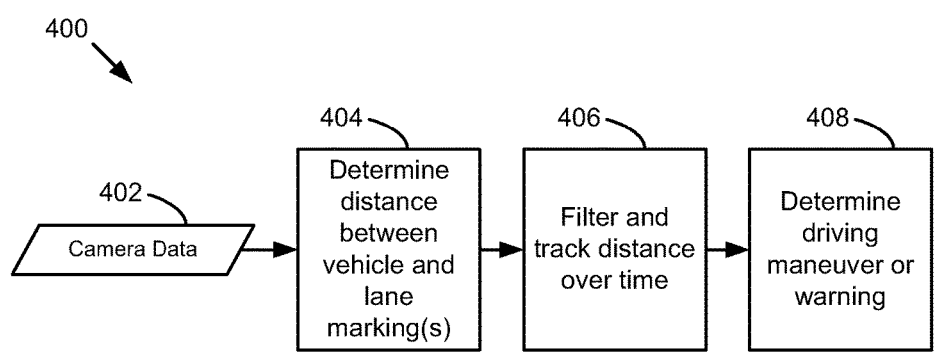
FIG. 4 is a schematic diagram illustrating a method for determining a position of a vehicle in a lane, according to one implementation.

FIG. 4 is a schematic diagram illustrating a method 400 for positioning a vehicle within a lane, according to one embodiment. The method 400 may be performed by a lane component 104 and/or an automated driving/assistance system 102.

The method 400 begins and camera data 402 is received from one or more cameras. The camera data 402 may include data from one or more side cameras, such as cameras that gather images of ground regions to a left side and/or right side of a vehicles (see, e.g., FIG. 2). Based on the camera data 402, the lane component 104 determines a distance at 404 between a parent vehicle and any lane markings detected in the camera data 402. In one embodiment, a neural network may be used to determine the distance at 404 between the vehicle and lane markings. In one embodiment, the lane component 104 may determine a position in a lane based on distances from markings on either side of the vehicle.

According to one embodiment, the neural network includes a deep convolutional neural network with 7, 8, or more layers. The neural network may include convolutional filter windows that correspond to a thickness, in pixels, of lane markings (such as painted lane lines). For example, the convolutional neural network may include inputs for each pixel of an image and consecutive layers may combine output from a plurality of previous layers. The number of outputs from a previous layer may correspond to the convolutional window size. In one embodiment, the lane component 104 determines the distance at 404 using one or more neural networks that include a Euclidian loss layer to signify a regression. The neural network may be configured to take in a color image of width M pixels and height N pixels and output a single integer in the range 0 to N. The output integer may correspond to the distance, in pixels, from the bottom of the image to the first pixel that corresponds to a lane marking. When scaled properly, the output integer may represent a distance between the center of the parent vehicle and a lane marking. In one embodiment, determining the distance to lane markings may be performed using images from both sides of the vehicle.

The lane component 104 filters and tracks the distance at 406 determined (at 404) over time. For example, the lane component 104 may filter at 406 outputs from a neural network (e.g., based on sequential images). In one embodiment, the lane component 104 filters at 406 the output using a state-space estimation technique and tracks the changes to provide information useful for balancing a vehicle in a lane, and/or for various active safety applications. The lane component 104 (or an automated driving/assistance system 100) determines at 408 a driving maneuver or a warning based on the filtered and tracked distance at 406. For example, if the distance is trending away from a center of a lane or toward a lane marking, the lane component 104 may determine a change in a driving path to move the vehicle toward a center of the lane. As another example, if the distance is trending away from the center of the lane a warning may be provided to a human driver to recommend moving back toward a center of the lane.

Figure 5:
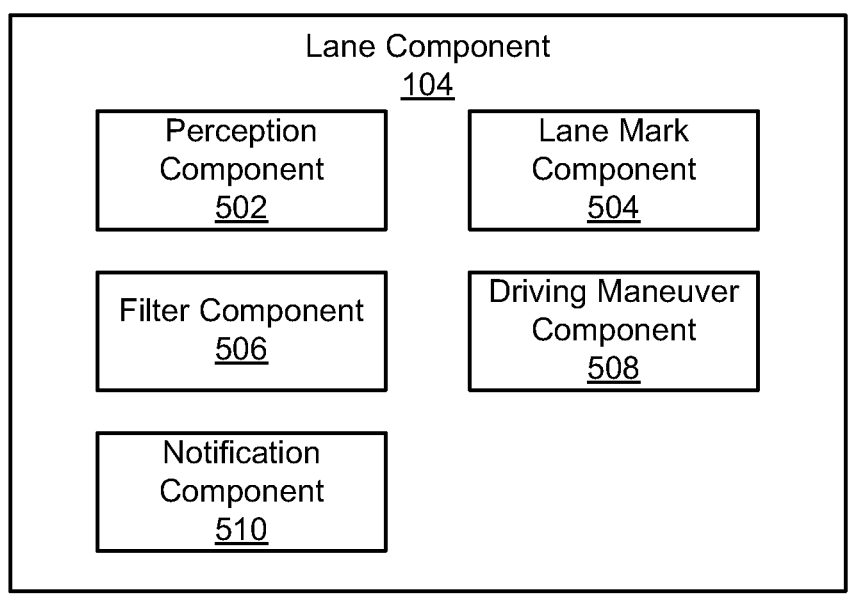
FIG. 5 is a schematic block diagram illustrating example components of a lane component, according to one implementation.

FIG. 5 is a block diagram illustrating example components of a lane component 104, according to one implementation. In the depicted embodiment, the lane component 104 includes a perception component 502, a lane mark component 504, a filter component 506, a driving maneuver component 508, and a notification component 510. The components 502-510 are given by way of illustration only and may not all be included in all embodiments. In fact, some embodiments may include only one or any combination of two or more of the components 502-510. Furthermore, some of the components 502-510 may be located outside the lane component 104, such as within an automated driving/assistance system 102.

The perception component 502 is configured to receive perception data from one or more perception sensors of a vehicle. For example, the perception component 502 may receive sensor data from a radar system 106, a LIDAR system 108, a camera system 110, and/or an ultrasound system 114. The perception data may include data for regions in any direction from the vehicle. For example, as a vehicle navigates down a road, or through any other driving environment, sensor systems may periodically provide data regarding the driving environment.

In one embodiment, the perception data includes images from a first camera positioned on a first side of a vehicle and a second camera positioned on a second side of the vehicle. The first and second cameras may include cameras that are positioned and directed to capture images of ground regions near a vehicle. For example, the cameras may face in directions substantially perpendicular to a driving axis of the vehicle (e.g., facing sideways). The term substantially is given to mean that the images need not be exactly perpendicular, but may be generally facing in a direction perpendicular to the driving axis (such as the direction of travel). The cameras may be positioned on opposite sides of the vehicle, such as on a left side and right side. Furthermore, the camera images may include low resolution camera images. For example, a vehicle may include one or more other cameras, such as a front facing camera, that provides significantly higher resolution images than the side cameras.

The lane mark component 504 is configured to determine a distance between the vehicle and one or more lane markings near the vehicle. For example, the lane mark component 504 may determine a distance between the vehicle and a lane marking on the left side and also determine a distance between the vehicle and a lane marking on the right side. Based on the distances to the lane markings on the left and/or right side, the lane mark component 504 may be able to determine whether the vehicle is centered within a current lane or if the vehicle is moving toward or away from a center of the lane. The distance may be a distance between a center or side panel of the vehicle and the lane marking.

In one embodiment, the lane mark component 504 determines distances between the vehicle and lane marking using one or more neural networks. The neural networks may include networks that have previously been trained to determine a distance between the vehicle and a lane marking. In one embodiment, a neural network may include a deep convolutional neural network. The neural network may have convolution filter windows sized based on a thickness of the lane markings. For example, a layer of the network may use multiple outputs of a previous layer as inputs to the layer. The number of outputs that are used as inputs may correspond to a height, in pixels, a lane marking is anticipated to have within an image. In one embodiment, the neural network may include a Euclidian loss layer.

In one embodiment, a neural network is configured to take each pixel of an M (width) by N (height) image as inputs and output an integer having a value ranging from 0 to N (the height of the image, in pixels). The output may correspond to the distance, in pixels, from a bottom of the image to the lowest pixel that corresponds to a lane marking. In one embodiment, a distance in feet or meters from a side panel or center of the vehicle may be computed using an offset value and a function that scales (linearly, hyperbolically, or otherwise) the output integer.

In one embodiment, the neural networks may be trained by providing pictures captured by side cameras and annotated by humans. Because side cameras and/or finding an integer value for the distance between a bottom of an image and a lane marking significantly simplifies lane positioning, fewer images may be needed to train the neural networks. Additionally, trained neural networks may be reused or retrained for different vehicles because the difference between images captured by side cameras may not vary as significantly from vehicle to vehicle as do top mounted or windshield mounted cameras. In fact, accuracy for side cameras and associated distance algorithms discussed herein may be sufficiently high that side cameras may be used for map building, verification for other algorithms, or the like.

The filter component 506 is configured to receive distance values (including raw pixel values or scaled/offset distance unit values). The filter component 506 may track the distance values over time to detect trends for a moving vehicle. For example, the filter component 506 may determine that a parent vehicle (e.g., the vehicle carrying the cameras and/or lane component 104) is moving away or toward a center of a current lane. The filter component 506 may filter the distance values to remove random errors in the detected distance and/or compute a smooth curve reflecting the vehicles lane position within a lane. The tracked and/or filtered values may be used for computing driving maneuvers or performing other automated driving or assistance functions.

The driving maneuver component 508 may determine one or more driving maneuvers to be performed by the vehicle and/or to be suggested to a vehicle controller or human driver. In one embodiment, the driving maneuver component 508 determines a driving maneuver that places or maintains the vehicle centered between the lane markings. The driving maneuver may include a speed, turn, or other driving aspect to cause the vehicle to maneuver along a roadway. In one embodiment, the driving maneuver may cause a gradual or slight turn of the wheels to cause the vehicle to move towards or stay at a center position, or any other desired position, within the lanes. For example, in one embodiment, the driving maneuver component 508 may determine a driving path that places the vehicle near a left or right side of the lane to avoid debris, increase a distance between the parent vehicle and a neighboring vehicle, and/or perform other positioning maneuvers within a lane. Thus, the lane component 104 may allow a vehicle to be at different positions within a lane while accounting for current driving situations. Obviously, in case of imminent collisions, lane changes, or the like, the driving maneuver component 508 may allow the vehicle to leave the current lane.

The notification component 510 is configured to provide a notification of a location or position of a vehicle with respect to a lane or one or more lane markings to a human driver or driving control system. For example, the notification component 510 may provide one or more distance values to the human driver or control system. In one embodiment, the notification component 510 may provide a notification to a human driver that the vehicle is not centered or is drifting away from a center of the lane. For example, the notification may be provided on a display such as a heads-up display, in-dash indicator, or using a speaker to provide a voice or audio notification. The notification may indicate a location of the vehicle with respect to the lanes to direct the human driver's attention to the location of the vehicle in the lane. In one embodiment, the notification component 510 may suggest a maneuver to be performed, such as a maneuver determined by the driving maneuver component 508. For example, the notification component 510 may suggest that a driver or vehicle control system move the vehicle towards the middle of a lane.

In one embodiment, the notification component 510 is configured to notify a decision making system or component of an automated driving/assistance system 102. For example, the notification component may provide a notification to a driving maneuver component 508 indicating a location of the vehicle with respect to one or more lane markings or a current lane. The decision making system or component may then be able to use the location or take a suggested maneuver into account in determining a driving path or driving maneuvers to be performed by the vehicle.

Figure 6:
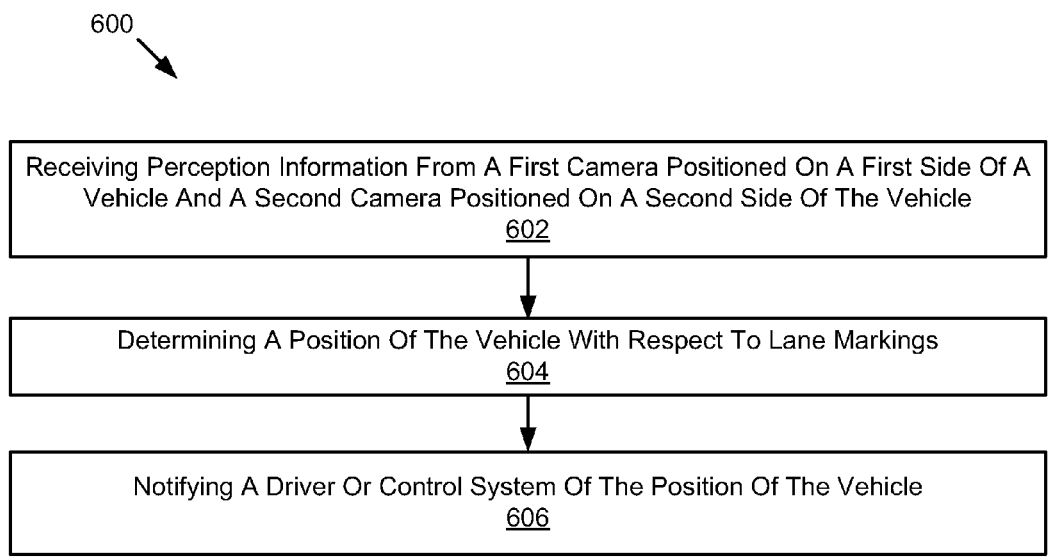
FIG. 6 is a schematic flow chart diagram illustrating a method for determining a location of a vehicle in a lane, according to one implementation.

Referring now to FIG. 6, a schematic flow chart diagram of a method 600 for determining a position of a vehicle in a lane is illustrated. The method 600 may be performed by a lane component or an automated driving/assistance system, such as the lane component 104 of FIG. 1 or 5 or the automated driving/assistance system 102 of FIG. 1.

The method 600 begins and a perception component 502 receives at 602 perception information from a first camera positioned on a first side of a vehicle and a second camera positioned on a second side of the vehicle. A lane mark component 504 determines at 604, using one or more neural networks, a position of the vehicle with respect to lane markings on the first side and the second side of the vehicle. A notification component 510 notifies at 606 a driver or control system of the position of the vehicle.

EXAMPLES

The following examples pertain to further embodiments.

Example 1 is a method that includes receiving perception information from a first camera positioned on a first side of a vehicle and a second camera positioned on a second side of the vehicle. The method includes determining, using one or more neural networks, a position of the vehicle with respect to lane markings on the first side and the second side of the vehicle. The method also includes notifying a driver or control system of the position of the vehicle.

In Example 2 the one or more neural networks in Example 1 include a deep convolutional neural network.

In Examples 3, the deep convolutional neural network in Example 2 includes convolution filter windows sized based on a thickness of the lane markings.

In Example 4, at least one of the one or more neural networks in any of Examples 1-3 comprises a Euclidian loss layer.

In Example 5, the one or more neural networks in any of Examples 1-4 are configured to receive an image having a width and a height and to output a distance between the vehicle and a lane marking of the one or more lane markings.

In Example 6, the distance in Example 5 includes a number in the range from 0 to the height of the image in pixels.

In Example 7, the distance in any of Examples 5-6 indicates one or more of: a distance from a center of the vehicle to the lane marking; and a distance from a side of the vehicle to the lane marking.

In Example 8, the cameras in any of Examples 1-7 face in a direction substantially perpendicular to a driving axis of the vehicle.

In Example 9, the method in any of Examples 1-8 includes determining a driving maneuver to place or keep the vehicle centered between the lane markings, wherein notifying the driver or control system comprises providing the driving maneuver to the driver or control system.

Example 10 is a system that includes a perception component, a lane mark component, and a notification component. The perception component is configured to receive data from a first camera positioned on a first side of a vehicle and a second camera positioned on a second side of the vehicle. The lane mark component configured to determine a distance between the vehicle and a lane marking positioned to the first side of the vehicle and determine a distance between the vehicle and a lane marking positioned to the second side of the vehicle. The notification component is configured to notify a driver or a control system of the position of the vehicle.

In Example 11, the lane mark component in Example 10 is configured to use one or more neural networks to determine the distance between the vehicle and a lane marking positioned to the first side of the vehicle and to determine the distance between the vehicle and the lane marking positioned to the second side of the vehicle.

In Example 12, the one or more neural networks of Example 11 include a deep convolutional neural network, wherein the deep convolutional neural network includes convolution filter windows sized based on a thickness of the lane markings.

In Example 13, the one or more neural networks in any of Examples 11-12 are configured to receive an image having a width M and a height N and to output a distance between the vehicle and a lane marking of the one or more lane markings and wherein the output include a number in the range from 0 to N.

In Example 14, the system in any of Examples 10-13 further include a maneuver component configured to determine a driving maneuver to place or maintain the vehicle centered between the lane markings, wherein the notification component is configured to provide the driving maneuver to the driver or control system.

In Example 15, the system in any of Examples 10-14 further include the first camera and the second camera.

In Example 16, the system in any of Examples 10-15 further include the vehicle.

Example 17 is computer readable storage media storing instructions that, when executed by one or more processors, cause the processors to receive data from both a first camera and a second camera, wherein the first camera is positioned on a first side of a vehicle and the second camera is positioned on a second side of the vehicle opposite the first side. The instructions further cause the one or more processors to determine, using a neural network, a position of the vehicle with respect to lane markings located to the first side and the second side of the vehicle. The instructions further cause the one or more processors to notify a driver or control system of a position of the vehicle.

In Example 18, the control system in Example 17 includes one or more of an automated control system and a driver assistance system.

In Example 19, the neural network in any of Examples 17-18 includes a deep convolutional neural network comprising convolution filter windows sized based on a thickness of the lane markings.

In Example 20, determining the position of the vehicle in any of Examples 17-19 includes determining one or more of a distance from a center of the vehicle to a lane marking of the lane markings and a distance from a side of the vehicle to a lane marking of the lane markings.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. method comprising:
    receiving perception information from a first camera positioned on a first side of a vehicle and a second camera positioned on a second side of the vehicle;
    determining, using one or more neural networks, a position of the vehicle with respect to lane markings on the first side and the second side of the vehicle, wherein the one or more neural networks comprises a deep convolutional neural network and the deep convolutional neural network comprises convolution filter windows sized based on a thickness of the lane markings; and
    notifying a driver or control system of the position of the vehicle.

2. The method of claim 1, wherein the at least one of the one or more neural networks comprises a Euclidian loss layer.

3. The method of claim 1, wherein the one or more neural networks are configured to receive an image comprising a width and a height and to output a distance between the vehicle and a lane marking of the one or more lane markings.

4. The method of claim 3, wherein the distance comprises a number in the range from 0 to the height of the image in pixels.

5. The method of claim 3, wherein the distance indicates one or more of:
    a distance from a center of the vehicle to the lane marking; and
    a distance from a side of the vehicle to the lane marking.

6. The method of claim 3, wherein the cameras face in a direction substantially perpendicular to a driving axis of the vehicle.

7. The method of claim 1, further comprising determining a driving maneuver to place or keep the vehicle centered between the lane markings, wherein notifying the driver or control system comprises providing the driving maneuver to the driver or control system.

8. A system comprising:
    a perception component configured to receive data from a first camera positioned on a first side of a vehicle and a second camera positioned on a second side of the vehicle;
    a lane mark component configured to
    determine a distance between the vehicle and a lane marking positioned to the first side of the vehicle, and
    determine a distance between the vehicle and a lane marking positioned to the second side of the vehicle, wherein the lane mark component is configured to use one or more neural networks to determine the distance between the vehicle and the lane marking positioned to the first side of the vehicle and to determine the distance between the vehicle and the lane marking positioned to the second side of the vehicle, wherein the one or more neural networks comprises a deep convolutional neural network, wherein the deep convolutional neural network comprises convolution filter windows sized based on a thickness of the lane markings; and a notification component configured to notify a driver or a control system of the position of the vehicle.

9. The system of claim 8, wherein the one or more neural networks are configured to receive an image comprising a width M and a height N and to output a distance between the vehicle and a lane marking of the one or more lane markings and wherein the output comprises a number in the range from 0 to N.

10. The system of claim 8, further comprising a maneuver component configured to determine a driving maneuver to place or maintain the vehicle centered between the lane markings, wherein the notification component is configured to provide the driving maneuver to the driver or control system.

11. The system of claim 8, further comprising the first camera and the second camera.

12. The system of claim 8, further comprising the vehicle.

13. Non-transitory computer readable storage media storing instructions that, when executed by one or more processors, cause the processors to:

receive data from both a first camera and a second camera, wherein the first camera is positioned on a first side of a vehicle and the second camera is positioned on a second side of the vehicle opposite the first side;

determine, using a neural network, a position of the vehicle with respect to lane markings located to the first side and the second side of the vehicle, wherein the neural network comprises a deep convolutional neural network comprising convolution filter windows sized based on a thickness of the lane markings; and notify a driver or control system of a position of the vehicle.

14. The non-transitory computer readable storage media of claim 13, wherein the control system comprises one or more of an automated control system and a driver assistance system.

15. The non-transitory computer readable storage media of claim 13, wherein determining the position of the vehicle comprises determining one or more of:

a distance from a center of the vehicle to a lane marking of the lane markings; and a distance from a side of the vehicle to a lane marking of the lane markings.

* * * * *